(12) United States Patent
Asano et al.

(10) Patent No.: US 7,357,379 B2
(45) Date of Patent: Apr. 15, 2008

(54) VIBRATION ISOLATING BUSHING (75) Inventors: Seiya Asano, Niwa-gun (JP); Kazuhiko Kato, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 0 days.

(21) Appl. No.: 10/313,390

(22) Filed: Dec. 5, 2002

(65) Prior Publication Data

US 2003/0107163 A1    Jun. 12, 2003

(30) Foreign Application Priority Data

Dec. 10, 2001 (JP) .............. 2001-375517
Jan. 30, 2002 (JP) .............. 2002-021531

(51) Int. Cl.
F16F 1/36 (2006.01)
(52) U.S. Cl. .................... 267/153; 267/141.7
(58) Field of Classification Search ........... 267/153, 267/141.1–141.7
See application file for complete search history.

(56) References Cited

U.S. PATENT DOCUMENTS

| | | | | |
|---|---|---|---|---|
| 3,762,671 A | * | 10/1973 | Schulz | 267/140.2 |
| 5,887,859 A | | 3/1999 | Hadano et al. | 267/141.1 |
| 6,286,821 B1 | * | 9/2001 | Schaffer | 267/141.4 |
| 6,419,214 B2 | * | 7/2002 | Palinkas | 267/141 |

FOREIGN PATENT DOCUMENTS

| | | |
|---|---|---|
| JP | 56-93366 U | 12/1954 |
| JP | 03-118335 U | 6/1991 |
| JP | 04-78341 U | 8/1992 |
| JP | 5-85121 | 4/1993 |
| JP | 5-126185 | 5/1993 |
| JP | 6-74275 | 3/1994 |
| JP | 06-54937 U | 7/1994 |
| JP | 08-114246 | 5/1996 |
| JP | 9-14348 | 1/1997 |
| JP | 09-100859 A | 4/1997 |
| JP | 11-208231 A | 8/1999 |
| JP | 2000-88026 | 3/2000 |
| JP | 2000-104775 | 4/2000 |
| JP | 2000-130509 | 5/2000 |
| JP | 2001-173699 | 6/2001 |

* cited by examiner

Primary Examiner—Xuan Lan Nguyen
(74) Attorney, Agent, or Firm—Beyer Weaver LLP

(57) ABSTRACT

A vibration isolating bushing including: an elastic body disposed in between and elastically connecting an inner sleeve and an outer sleeve surrounding the inner sleeve. The elastic body has two pairs of axial bores diametrically opposed to each other and axially extends therethrough between the inner and outer sleeves to be independent of each other, and is circumferentially divided in terms of stress transmission by the two pairs of axial bores into two pairs of segments diametrically opposed to each other. Two diametric lines, extending in directions in which the two pairs of axial bores are respectively opposed to each other, intersect obliquely so that the two pairs of segments are made different from each other in their circumferential lengths for differentiating spring characteristics of the bushing in two diametric directions in which said two pairs of segments are opposed to each other, respectively.

11 Claims, 6 Drawing Sheets

VIBRATION ISOLATING BUSHING

INCORPORATED BY REFERENCE

The disclosure of Japanese Patent Application No. 2001-375517 filed on Dec. 10, 2001, and No. 2002-021531 filed on Jan. 30, 2002, each including the specification, drawings and abstract, are incorporated herein by reference in their entirety.

BACKGROUND OF THE INVENTION

1. Field of the Invention

The present invention generally relates to cylindrical vibration isolating bushings each comprising an elastic body and being applicable to suspension bushings, engine roll mounts, and member mounts for use in automotive vehicles, and other mounts or bushings for use in various devices or equipments other than the automotive vehicles, such as mounts for supporting electric mortars, for example. More particularly, the present invention is concerned with a vibration isolating bushing that is novel in construction and that is capable of establishing a satisfactory ratio of spring constants of the elastic body in two mutually orthogonal diametric vibration input directions, without needing a provision of slits or voids located on a diametric line extending in at least one of the two vibration input directions, which may cause noises upon application of a relatively large vibrational load in the vibration input direction.

2. Description of the Related Art

Vibration isolating bushings are known as one type of vibration damping devices to be installed between two members of a vibration-transmitting system. JP-A-5-126185 discloses a known example of such vibration isolating bushings, wherein an outer sleeve member is disposed radially outward of an inner shaft member with a radial spacing therebetween, and is elastically connected with the inner shaft member by means of a cylindrical elastic body disposed in the radial spacing between the inner shaft member and the outer sleeve member. Such a vibration isolating bushing is capable of exhibiting a vibration isolating effect with respect to vibrational loads applied in a variety of diametric or radial directions, an axial direction, a torsional direction, a twisting direction and other possible directions. For this capability, the vibration isolating bushings have been used for suspension bushings for use in automotive vehicles, for example.

In order to mutually adjust spring constants of the elastic body in two mutually orthogonal diametric directions, or alternatively to adjust the spring constant of the elastic body in a twisting direction, the cylindrical elastic body of the vibration isolating bushing is generally provided with axial slits extending therethrough in the axial direction with a given circumferential width. The axial slits are formed to be located on a diametric line extending along at least one of the two vibration input directions, as seen in a transverse cross section of the vibration isolating bushing.

However, when a relatively large vibrational load is applied to the vibration isolating bushing in the diametric line of the vibration input direction, radially opposed parts of an inner surface of each slit are brought into abutting contact and rub together in a direction in which these parts of the inner surface are displaced relative to each other. As a result, the conventional vibration isolating bushing is prone to cause noises and fine vibrations due to the contact and rub between the radially opposed parts of the inner surface of the slit.

SUMMARY OF THE INVENTION

It is therefore one object of this invention to provide a vibration isolating bushing that is novel in construction and that is capable of establishing a satisfactory large ratio of spring constants thereof in two mutually orthogonal diametric directions in which vibrations are applied to the bushing, by suitably varying spring characteristics thereof in the two diametric directions, without suffering from the conventionally experienced problem, i.e., noises and slight vibrations caused by the above-described slits or voids formed through its elastic body to be located on a diametric line extending along at least one of the two diametric directions.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A vibration isolating bushing includes: an inner shaft member; an outer sleeve member disposed radially outward of the inner shaft member; and an elastic body disposed in between and elastically connecting the inner shaft member and the outer sleeve member. The elastic body is provided with two pairs of axial bores diametrically opposed to each other with the inner shaft member interposed therebetween, the axial bores axially extending through the elastic body between the inner shaft member and the outer sleeve member and being independent of each other, and the elastic body is circumferentially divided in terms of stress transmission by the two pairs of axial bores into two pairs of segments diametrically opposed to each other with the inner shaft member interposed therebetween, while two diametric lines, which extends in directions in which the two pairs of axial bores are respectively opposed to each other, intersect obliquely so that the two pairs of segments are made different from each other in their circumferential length for differentiating spring characteristics of the bushing in two diametric directions in which the two pairs of segments are opposed to each other, respectively.

In the vibration isolating bushing constructed according to this mode of the invention, the two pairs of axial bores are employed for a technique of adjusting sizes of pressure-receiving regions of the elastic body in vibrational load input directions where the elastic body is compressed and extended, instead of the slits employed in the aforesaid conventional vibration isolating bushings for the conventional technique of isolating the inner-shaft-side part of the elastic body and the outer-sleeve-side part of the elastic body in the load input direction. Namely, the use of the axial bore in the present vibration isolating bushing is based on a basic technical through that is completely different from that in the conventional bushing using the slit. The use of the axial bores makes it possible to define circumferential length of the pressure-receiving regions of the elastic body, thereby adjusting spring characteristics in the load input directions, i.e., diametric directions of the elastic body and the vibration isolating bushing perpendicular to a center axis of the bushing. Further, the two diametric lines, which extend in directions in which the two pairs of axial bores are respectively opposed to each other, are arranged to intersect obliquely to each other so that the sizes of the pressure-receiving regions or the circumferential lengths of the two pairs of segments opposed to each other in the two mutually orthogonal diametric directions, are made different from each other for respectively receiving vibrational loads in the diametric directions. This arrangement makes it possible to provide a satisfactory large ratio of the spring constants in the two orthogonal diametric directions.

Therefore, the vibration isolating bushing of this mode of the invention can completely eliminate the conventionally experienced problems, namely, the noises and slight vibrations due to the compression of the slits upon application of the vibrational loads, while being capable of suitably adjusting the ratio of the spring constants in the mutually orthogonal diametric directions thereof.

In addition, the two pairs of axial bores are located to be spaced apart from mutually orthogonal vibration input directions in a circumferential direction of the vibration isolating bushing, whereby the presence of the axial bores does not cause significant stress concentration in the elastic body, although the conventional vibration isolating bushing includes the axial slits located on a diametric line extending in the vibration input direction, and accordingly suffers from the problem of distortion or stress concentration of the elastic body at circumferentially opposite end portions of the slits and resultant occurrence of cracks at the circumferentially opposite end portions. Therefore, the vibration isolating bushing of this mode of the invention can eliminate the conventionally experienced problem, i.e., the distortion or stress concentration in a local portion of the elastic body and resultant occurrence of cracks at the portion, thus assuring high durability of the vibration isolating bushing.

As is understood from the aforesaid description, the vibration isolating bushing of this mode of the invention is capable of eliminating the problems of the noises and slight vibrations experienced in the conventional vibration isolating bushing, while making it possible to easily tune the ratio of the spring constants in the mutually orthogonal two diametric directions over a satisfactory wide possible range. Thus, the vibration isolating bushing of this mode of the invention exhibits high utility.

Each axial bore may be suitably shaped provided the axial bore is capable of preventing direct transmission of the elastic deformation between adjacent ones of the segments of the elastic body, which are located on the circumferentially opposite side of each axial bore. Generally, each axial bore extends through a radially intermediate portion of the elastic body in the axial direction of the elastic body, where a state of the elastic body is not restricted by the inner shaft member and the outer sleeve member. More preferably, each axial bore is shaped to have a radial dimension enough for extending substantially entire radial dimension between the inner shaft member and the outer sleeve member and leaving coating layers on an outer circumferential surface of the inner shaft member and an inner circumferential surface of the outer sleeve member.

The specific size and shape of each axial bore may be suitably determined while taking into account required vibration isolating characteristics and anti-load characteristics, durability, and a selected rubber material. Preferably, a cross sectional shape and size of each axial bore is determined so as not to be compressed to cause an abutting contact of opposite portions of an inner surface of the axial bore upon a normal vibrational load is applied to the vibration isolating bushing given as a designing parameter.

(2) A vibration isolating bushing according to the above-indicated mode (1), wherein each of the axial bores has a circumferential width dimension smaller than that of any one of the two pairs of segments. The vibration isolating bushing constructed according to this mode of the invention is capable of providing a sufficiently large overall volume of the elastic body, while ensuring an excellent tuning of the ratio of the spring constants in the mutually orthogonal diametric directions owing to the presence of the two pairs of axial bores.

(3) A vibration isolating bushing according to the above-indicated mode (1) or (2), wherein each of the axial bores has a teardrop like or a biased ellipsoidal shape in transverse cross section, whose circumferential width dimension is made larger on a side of the outer sleeve member rather than on a side of the inner shaft member. According to this arrangement, a transverse cross sectional shape of each axial bore is defined by a profile of the biased ellipsoidal shape where no edge or junction is formed, making it possible to further effectively eliminate or moderate stress concentration at local points of the elastic body, during elastic deformation of the elastic body due to input vibrational loads, resulting in a further improved durability and anti-load capability of the vibration isolating bushing. Further, the circumferential width dimension of each axial bore is made smaller on the side of the inner shaft member rather than on the side of the outer sleeve member, making it possible to provide an effective volume to radially inner portions of the segments of the elastic body, in which circumferential lengths of the segments are made small. Furthermore, when a torsional load acts between the inner shaft member and the outer sleeve member in the circumferential direction of the vibration isolating bushing, an amount of elastic deformation of the elastic body is made larger at its radially outer portion rather than its radially inner portion. Since the circumferential width dimension of each axial bore is made larger at the radially outer portion of the elastic body, the compression of each axial bore upon application of the circumferential torsional load is effectively avoided.

(4) A vibration isolating bushing according to any one of the above-indicated modes (1)-(3), wherein a ratio of dynamic spring constants in the two diametric directions in which the two pairs of segments are opposed to each other is smaller than one to two. This arrangement permits each segment of the elastic body and the entire elastic body to be satisfactory in its volume for exhibiting an excellent anti-vibration capability, while making it possible to easily tune the ratio of the spring constants in the mutually orthogonal diametric directions of the vibration isolating bushing with the two pairs of axial bores, without needing additional means or members for adjusting the ratio of the spring constants. By "the ratio of the dynamic spring constant smaller than one to two" is meant the dynamic spring constant in one of the mutually orthogonal two diametric directions is made smaller than a half of the dynamic spring constant in the other diametric direction.

(5) A vibration isolating bushing according to any one of the above-indicated modes (1)-(4), wherein one of the two pairs of segments has a circumferential length smaller than that in an other one of the two pairs of segments, and has an axial length smaller than that in the other one of the two pairs of segments. According to this mode of the invention, one pair of the segments having a relatively small circumferential length and a soft spring characteristics in comparison with the other pairs of the segments, are arranged to be shorten in their axial length, for further minimizing their spring characteristics. This makes it possible to further increase the ratio of the spring constants in the mutually orthogonal two diametric directions, more specifically making it possible to arrange the ratio of the spring constant to one to two or more, for example, thus improving a degree of freedom in tuning of the spring characteristics of the elastic body. In this respect, the axial length of the segments is made small, while maintaining a volume of the pressure receiving region of the segments in the circumferential direction of the elastic body. This effectively ensures sufficient durability of the segments of the elastic body with respect to input vibrational loads in the twisting direction.

(6) A vibration isolating bushing according to any one of the above-indicated modes (1)-(5), wherein points of intersections between circumferential center lines of the axial bores and an inner circumference of the outer sleeve member are all located outward of the inner shaft member as seen in projections in the two diametric directions in which the two pairs of segments are opposed to each other, respectively. In the vibration isolating bushing constructed according to this mode of the invention, when a vibrational load is applied to the bushing in one of the two diametric directions in which one pair of segments of the elastic body are opposed to each other, compression deformation of the other pair of the segments of the elastic body is effectively avoided or minimized. Therefore, the vibration isolating bushing of this mode of the invention can establish a further increased ratio of the spring constant in the mutually orthogonal two diametric directions in which the two pairs of segments of the elastic body are opposed to each other, respectively.

(7) A vibration isolating bushing according to any one of the above-indicated modes (1)-(6), wherein the two diametric directions in which the two pairs of segments are respectively opposed to each other are aligned to vibration input directions, respectively. In the case where the vibration isolating bushing of this mode of the invention is used as a suspension bushing for use in an automotive vehicle, for example, the bushing is installed on the vehicle such that one pair of the segments having a small circumferential length are opposed to each other in a traveling direction of the vehicle, while the other pair of the segments having a large circumferential length are opposed to each other in a transverse direction of the vehicle, for thereby exhibiting an excellent driving comfort based on its soft spring characteristics in the traveling direction of the vehicle, and an excellent steering stability based on its hard spring characteristics in the transverse direction of the vehicle. Thus, the vibration isolating bushing according to this mode of the invention is capable of effectively establishing different spring characteristics required in different diametric directions.

(8) A vibration isolating bushing according to any one of the above-indicated modes (1)-(7), wherein the elastic body is directly bonded to an outer circumferential surface of the inner shaft member, and the inner shaft member is formed with a circumferential groove extending circumferentially and open in a portion of the outer circumferential surface to which the elastic body is bonded. In the vibration isolating bushing according to this mode of the invention, the provision of the circumferential groove in the inner shaft member makes it possible to change a free length of the elastic body in radial directions perpendicular to the center axis of the bushing, without varying an outer diameter of the outer sleeve member, thus permitting a decrease of spring constant of the elastic body in the radial direction and an ease of elastic distortion of the segments of the elastic body in the radial direction. With respect to an axial load, on the other hand, a part of the elastic body filling the circumferential groove become malfunction or substantially undeformable. Thus, it is possible to tune the spring characteristics in the axial and radial directions of the bushing relative to each other, by suitably adjusting the circumferential groove in terms of size, shape, or the like, resulting in a further enhanced degree of freedom in tuning the spring characteristics of the vibration isolating bushing.

(9) A vibration isolating bushing according to any one of the above-indicated modes (1)-(8), wherein the inner shaft member includes a large diameter portion whose diameter gradually increases from axially opposite portions thereof toward an axially central portion thereof, and the elastic body is directly bonded to an outer circumferential surface of the large diameter portion of the inner shaft member. This arrangement makes it possible to reduce a spring constant of the elastic body in a twisting direction in which center axes of the inner shaft member and the outer sleeve member are inclined relative to each other, while effectively maintaining spring characteristics of the elastic body in the radial directions. Thus, the spring characteristics of the elastic body in the twisting direction can be easily tuned by adjusting shape of the large diameter portion of the inner shaft member.

(10) A vibration isolating bushing according to the above-indicated mode (9), wherein the elastic body is provided with a pair of annular slit-like grooves open in opposite axial end faces thereof and extending axially inwardly by a given depth to be located on inclined surfaces of the large diameter portion where a diameter of the inner shaft member gradually increases, the annular slit-like grooves extending continuously over entire circumferences thereof. This arrangement makes it possible to further reduce the spring constant of the elastic body in the twisting direction. Also, a suitable adjustment of each slit-like groove in terms of its depth, shape or the like can further enhance the degree of freedom in tuning the spring characteristics of the elastic body in the twisting direction. Preferably, the pair of annular slit-like grooves are located in close vicinity to an apex of the large diameter portion of the inner shaft member in radial directions for effectively reducing the spring constant of the elastic body in the twisting direction. The shape of each slit-like groove is not particularly limited. For instance, a radial width dimension of each slit-like groove may be made constant over an entire axial length thereof. Alternatively, the radial width dimension of each slit-like groove may vary in its axial width direction so that the radial width dimension gradually increases in an axially outward direction.

(11) A vibration isolating bushing according to the above-indicated mode (10), wherein the elastic body is compressed by a pre-load applied thereto in the radial direction after being vulcanized so that the pair of annular slit-like grooves are compressed. This arrangement can avoid a reduction of the spring stiffness of the elastic body in the radial directions due to the presence of the slit-like grooves. Thus, the vibration isolating bushing of this mode of the invention is able to effectively reduce the spring constant of the elastic body in the twisting direction with the help of the slit-like grooves, while satisfactory ensuring the spring stiffness of the elastic body in the radial directions.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
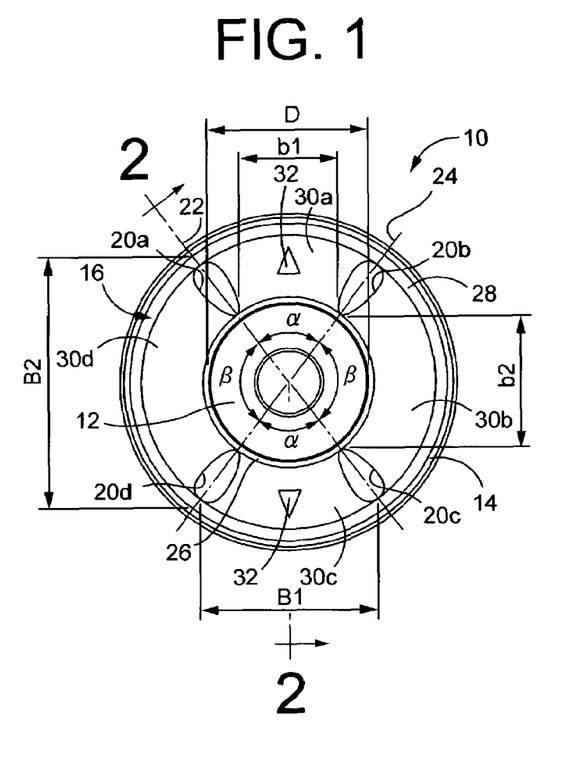
FIG. 1 is an elevational view in one of opposite axial ends of a vibration isolating bushing in the form of a suspension bushing for use in an automotive vehicle, which is constructed according to a first embodiment of the invention.
Figure 2:
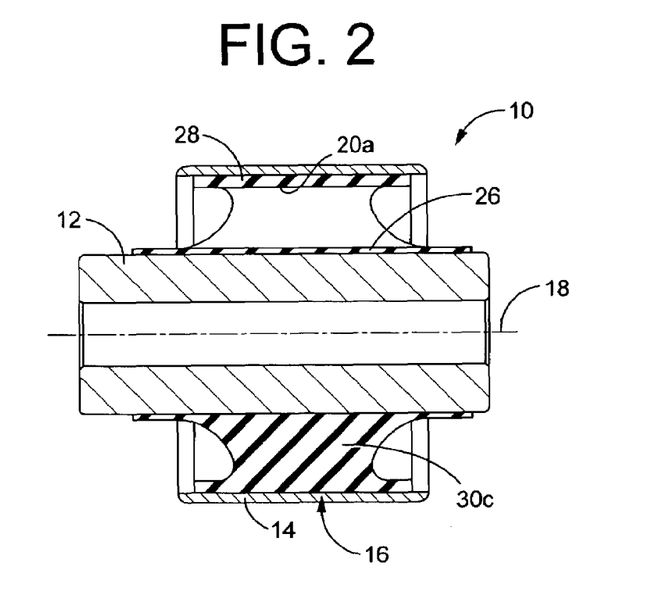
FIG. 2 is a cross sectional view taken along line 2-2 of FIG. 1.

Referring first to FIGS. 1 and 2, a suspension bushing 10 for use in automotive vehicles is depicted as a first embodiment of a vibration isolating bushing of the present invention. The suspension bushing 10 is a generally thick-walled cylindrical product wherein an inner shaft member in the form of an inner sleeve 12 and an outer sleeve member in the form of an outer sleeve 14, which is disposed radially outward of the inner sleeve 12 with a spacing therebetween, are elastically connected with each other by an elastic body 16 interposed therebetween. The suspension bushing 10 may be installed on the vehicle such that the inner sleeve 12 is attached to a member on the side of a body frame, while the outer sleeve 14 is attached to a member on the side of a suspension arm, whereby the suspension arm is connected to the body frame in a vibration isolating fashion.

More specifically described, the inner sleeve 12 is a thick-walled straight cylindrical member made of a rigid material such as steel or other metallic materials. The inner sleeve 12 is surrounded by the outer sleeve 14 with a radial spacing therebetween. The outer sleeve 14 is a thin-walled straight cylindrical member with a sufficiently large diameter, which is made of a rigid material like the inner sleeve 12. For use as a suspension bushing, the outer sleeve 14 is generally dimensioned to have an inner diameter that is about 1.5-4 times an outer diameter of the inner sleeve 12. It should be appreciated that the inner and outer sleeves 12, 14 may be suitably dimensioned relative to each other with required characteristics taken into consideration, without any limitation. In the present embodiment, for example, an axial length of the inner sleeve 12 is made larger than that of the outer sleeve 14 so that opposite axial ends of the inner sleeve 12 protrude axially outwardly from opposite axial ends of the outer sleeve 14, respectively.

The inner and outer sleeve members 12, 14 are disposed in a mutually co-axial or concentric relationship with each other, and the elastic body 16 is interposed between an outer circumferential surface of the inner sleeve 12 and an inner circumferential surface of the outer sleeve 14, which are radially opposed to each other with a given radial spacing therebetween. The outer elastic body 16 is a generally thick-walled cylindrical member made of a rubber material, and is bonded at its inner circumferential surface to the outer circumferential surface of the inner sleeve 12 and at its outer circumferential surface to the inner circumferential surface of the outer sleeve 14 in the process of vulcanization of the rubber material for forming the elastic body 16. Thus, the inner and outer sleeve 12, 14 and the elastic body 16 cooperate to form an integrally vulcanized assembly.

The elastic body 16 is shaped as a solid of revolution about a center axis 18 of the suspension bushing 10. Opposite axial end portions of the elastic body 16 are tapered such that an outer diameter of the elastic body 16 gradually decreases in the axially outward directions at the both axial end portions of the elastic body 16. This arrangement ensures a volume of an inner circumferential portion of the elastic body 16 in which a circumferential length is made smaller than that in an outer circumferential portion of the elastic body 16. Inner and outer edges of each end face of the elastic body 16 are bonded to the inner and outer sleeves 12, 14 with so-called "fillet" or curved surfaces, for thereby improving durability of the elastic body 16 at end portions of its inner and outer surfaces bonded to the inner and outer sleeves 12, 14.

The elastic body 16 has four axial bores 20a, 20b, 20c, 20d in total, which are formed at respective circumferential portions spaced apart from each other in a circumferential direction of the elastic body 16. The four axial bores 20a, 20b, 20c, 20d are made identical in shape with one another, and extend through the elastic body 16 between the inner and outer sleeves 12, 14 with a constant shape in transverse cross section while being parallel to the center axis 18. More specifically, each axial bore 20 has a teardrop like or a biased ellipsoidal shape in its overall transverse cross section, in which a radially inner small-diameter arc portion and a radially outer large-diameter arc portion are connected with each other at their opposite circumferential ends via curved lines. Namely, a circumferential width of each axial bore 20 is made larger on the side of the outer sleeve 14 rather than on the side of the inner sleeve 12.

A pair of the axial bores 20a, 20c are opposed to each other in one diametric direction of the suspension bushing 10, while a pair of the axial bores 20b, 20d are opposed to each other in another diametric direction of the suspension bushing 10. Described in detail, the pair of axial bores 20a, 20c are located on opposite sides of a diametric line 22 of the suspension bushing 10 as seen in FIG. 1, such that major axes or circumferential center lines of the axial bores 20a, 20c coincide with the diametric line 22. Likewise, the pair of axial bores 20b, 20d are located on opposite sides of a diametric line 24 of the suspension bushing 10 such that major axes or circumferential center lines of the axial bores 20b, 20d coincide with the diametric line 24 shown in FIG. 1.

These diametric lines 22, 24 intersect obliquely but not intersect at right angles. According to the present embodiment, an angle α of a pair of intersections vertically opposite with each other as seen in FIG. 1 is made smaller than an angle β of a pair of intersections horizontally opposite with each other as seen in FIG. 1. The angles α, β of the intersections may be suitably determined with no limitation, depending upon required spring characteristics of the suspension bushing 10. In the present embodiment, for example, the angles α, β of the intersections measures about 75 degrees and 105 degrees, respectively.

In this arrangement, circumferential spacing between adjacent ones of axial bores 20a, 20b, 20c, 20d are made larger and smaller in turn in the circumferential direction of the suspension bushing 10. Namely, circumferential distances between the axial bores 20a, 20d and between the axial bores 20b, 20c are made larger than that between the axial bores 20a, 20b and between the axial bores 20c, 20d.

Also, the axial bores 20a, 20b, 20c, 20d have a radial length that is slightly smaller than the radial spacing between the inner and outer sleeves 12, 14 so that only a thin rubber layer 26 coating the outer circumferential surface of the inner sleeve 12 and a thin rubber layer 28 coating the inner circumferential surface of the outer sleeve 14 are left at the four circumferential portions of the elastic body 16 where the four axial bores 20a, 20b, 20c, 20d are formed. That is, the elastic body 16 is substantially divided into four segments 30a, 30b, 30c, 30d by the provision of the four axial bores 20a, 20b, 20c, 20d. The four segments 30a, 30b, 30c, 30d are connected with one another via the thin rubber layers 26, 28 that is provided for the purpose of allowing the elastic body 16 to be into an integral body consisting of the segments 30a, 30b, 30c, 30d and the thin rubber layers 26, 28. In the present embodiment, width dimensions of the first through fourth segments 30a, 30b, 30c, 30d of the elastic body 16 are made sufficiently larger than a width or circumferential dimension of each axial bore 20. The width dimension of each axial bore 20 is suitably determined with no limitation, while taking into account the required characteristics of the suspension bushing 10. Preferably, each axial bore 20 measures about 5-30 degrees in circumferential length or width dimension about center axis 18.

The circumferential width dimensions of the four segments 30a, 30b, 30c, 30d vary in turn in the circumferential direction of the suspension bushing 10, since the circumferential spacing between adjacent ones of axial bores 20a, 20b, 20c, 20d are made large and small in turn in the circumferential direction of the suspension bushing 10, as described above. Namely, a pair of segments 30a, 30c (hereinafter referred to as "first segments 30a, 30c"), which are opposed to each other in the vertical direction as seen in FIG. 1, have a first circumferential width dimension, while a pair of segments 30b, 30d (hereinafter referred to as "second segments 30b, 30d"), which are opposed to each other in the horizontal direction as seen in FIG. 1, have a second circumferential width dimension that is made larger than the first circumferential width dimension.

As seen in the vertical projection of FIG. 1, a distance B1 between points of intersections between the inner circumferential surface of the outer sleeve 14 and the diametric lines 22, 24, i.e., the major axes of the axial bores 20a, 20b and 20c, 20d, located on the horizontally opposite sides of the first segments 30a and 30c, is made larger than an outer diameter D of the inner sleeve 12. As seen in the horizontal projection of FIG. 1, on the other hand, a distance B2 between points of intersections between the inner circumferential surface of the outer sleeve 14 and the diametric lines 22, 24, i.e., the major axes of the axial bores 20a, 20d and 20b, 20c, located on the vertically opposite sides of the second segments 30d and 30b, is made larger than the outer diameter D of the inner sleeve 12.

When a vibrational load is applied between the inner and outer sleeves 12, 14 in a first diametric direction where the first segments 30a and 30c of the elastic body 16 are opposed to each other (i.e., in the vertical direction as seen in FIG. 1), the first segments 30a and 30c are effectively subjected to compression and/or tensile deformation, while the second segments 30b and 30d, which are opposed to each other in a second diametric direction perpendicular to the first diametric direction in which the vibrational load is applied, are mainly subjected to shear deformation with no or reduced compression and/or tensile deformation. In this case, spring characteristics of the suspension bushing 10 heavily rely on those of the first segments 30a and 30c. When a vibrational load is applied between the inner and outer sleeves 12, 14 in the second diametric direction (i.e., in the horizontal direction as seen in FIG. 1), on the other hand, the second segments 30b and 30d are effectively subjected to compression and/or tensile deformation, while the first segments 30a and 30c, which are opposed to each other in the first diametric direction perpendicular to the second diametric direction in which the vibrational load is applied, are mainly subjected to shear deformation with no or reduced compression and/or tensile deformation. In this case, spring characteristics of the suspension bushing 10 heavily rely on those of the second segments 30b and 30d.

As seen in a projection in the first diametric direction of FIG. 1, a distance b1 between points of intersections between the outer circumferential surface of the inner sleeve 12 and the diametric lines 22, 24, i.e., the major axes of the axial bores 20a, 20b and 20c, 20d, located on the horizontally opposite sides of the first segments 30a and 30c, is made smaller than the outer diameter D of the inner sleeve 12. Likewise, as seen in a projection in the second diametric direction of FIG. 1, a distance b2 between points of intersections between the outer circumferential surface of the inner sleeve 12 and the diametric lines 22, 24, i.e., the major axes of the axial bores 20a, 20d and 20b, 20c, located on the vertically opposite sides of the second segments 30d, 30b, is made smaller than the outer diameter D of the inner sleeve 12.

An integrally vulcanized assembly consisting of the inner and outer sleeves 12, 14 and the elastic body 16 formed with the four axial bores 20a, 20b, 20c, 20d, may be formed, for example, by setting the inner and outer sleeves 12, 14 subjected to an adhesive treatment in advance, in a mold cavity having four rod shaped cores corresponding to the axial bores 20a, 20b, 20c, 20d, and by injecting and vulcanizing a given amount of suitable rubber material therein. The thus formed integrally vulcanized assembly may be subjected to a drawing operation, e.g., all directional drawing, where the outer sleeve 14 is drawn radially inwardly onto the first sleeve 12, as needed. Thus, it is provided the suspension bushing 10 constructed according to the present embodiment as shown in FIGS. 1 and 2. In this respect, the drawing operation performed after the vulcanization of the rubber material makes it possible to effectively eliminate internal stresses possibly generated in the elastic body 16 in a direction of tensile deformation, due to shrinkage of the elastic body 16 during the vulcanization of the rubber material, or alternatively to give a pre-load to the elastic body 16 for adjusting a spring constant, durability or other characteristics of the elastic body 16.

The thus formed suspension bushing 10 is installed on the vehicle such that the first diametric direction where the first segments 30a, 30c with a relatively small circumferential length are opposed to each other is aligned to a traveling direction of the vehicle, while the second diametric direction where the second segments 30b, 30d with a relatively large circumferential length are opposed to each other is aligned to a transverse direction of the vehicle. Namely, the first and second diametric directions are aligned to primary vibration input directions respectively. For the sake of easiness and accuracy in circumferential positioning of the suspension bushing 10 on the vehicle, center marks 32 may be provided on at least one of axially opposite end faces of the first segments 30a, 30c, by painting, embossing or other suitable method.

In the suspension bushing 10 constructed according to the present embodiment, the first segments 30a, 30c are adapted to be subjected to mainly compression and/or tensile deformation and exhibit a great impact on dynamic spring characteristics of the suspension bushing 10, when the suspension bushing 10 is subjected to a vibrational load applied thereto in the traveling direction of the vehicle. Also, the second segments 30b, 30d are adapted to be subjected to mainly compression and/or tensile deformation, and exhibit a great impact on the dynamic spring characteristics of the suspension bushing 10, when the suspension bushing 10 is subjected to a vibrational load applied thereto in the transverse direction of the vehicle. These first segments 30a, 30c and the second segments 30b, 30d are made different in circumferential length from each other due to the provision of the axial bores 20a, 20b, 20c, 20d, so as to be provided with suitable volumes for receiving the vibrational loads (hereinafter referred to as a "pressure receiving volume" where appropriate). Thus, the dynamic spring characteristics of the suspension bushing 10 differ in the two diametric directions, i.e., the traveling and transverse directions of the vehicle. Therefore, the suspension bushing 10 can exhibit soft spring characteristics with respect to vibrational loads applied thereto in the traveling direction of the vehicle, thereby ensuring good driving comfort of the vehicle, while exhibiting hard spring characteristics with respect to vibrational load applied thereto in the transverse direction of the vehicle, thereby improving steering stability of the vehicle.

It should be appreciated that the suspension bushing 10 of this embodiment makes it possible to form the first and second segments 30a, 30b, 30c and 30d, which are subjected to compression and/or tensile deformation in the primary vibration input directions, as solid bodies or blocks with no slit or hole having a wide circumferential width formed therethrough, unlike the aforementioned conventional suspension bushing wherein the slits or holes formed through a part of the elastic body which is subjected to compression and/or tensile deformation in the primary vibration input directions. For this arrangement, the present suspension bushing 10 can eliminate the conventionally experienced problems, i.e., noises and slight vibrations caused by the slit or holes, even when a relatively large vibrational load is applied to the suspension bushing 10.

Further, each axial bore 20 is defined by a smoothly curved surface with no junction, making it possible to eliminate or moderate stress concentration at a local point of the first and second segments 30a, 30b, 30c, 30d of the elastic body 16, resulting in further improved durability of the elastic body 16 of the suspension bushing 10.

Figure 3:
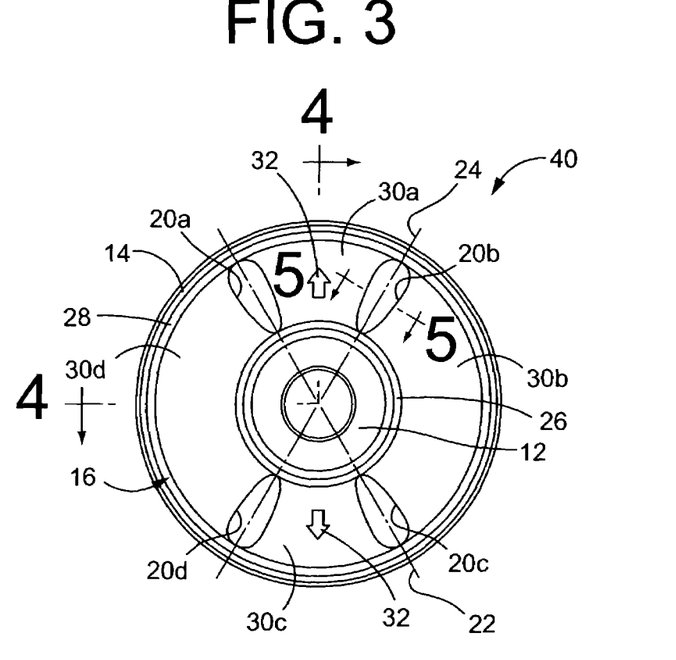
FIG. 3 is an elevational view in one of opposite axial ends of a vibration isolating bushing in the form of a suspension bushing for use in the automotive vehicle, which is constructed according to a second embodiment of the invention.
Figure 4:
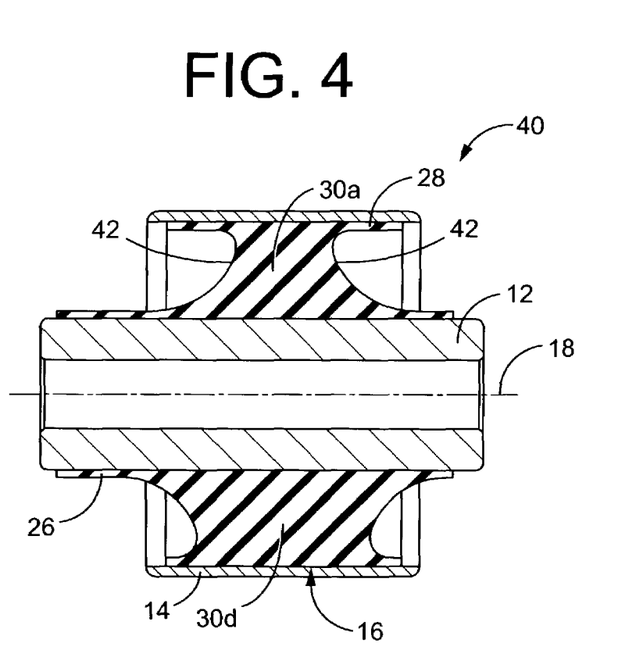
FIG. 4 is a cross sectional view taken along line 4-4 of FIG. 3.

Referring next to FIGS. 3-4, a suspension bushing 40 for use in automotive vehicles is depicted as a second embodiment of a vibration isolating bushing of the present invention. In the following description, the same reference numerals as used in the first embodiment will be used for identifying structurally corresponding elements and portions, of which no detailed description will be provided.

The suspension bushing 40 of the present embodiment has been developed in order to provide a sufficiently large ratio of spring constants of the elastic body 16 in two mutually-orthogonal diametric directions as primary vibration input directions (i.e., the vertical and horizontal direction as seen in FIG. 3). To this end, the suspension bushing 40 of the present embodiment is made different from the suspension bushing 10 of the first embodiment in that a difference between the angles α and β of the two kinds intersections formed by the diametric lines 22, 24 is made larger than that in the suspension bushing 10 of the first embodiment.

Figure 5:
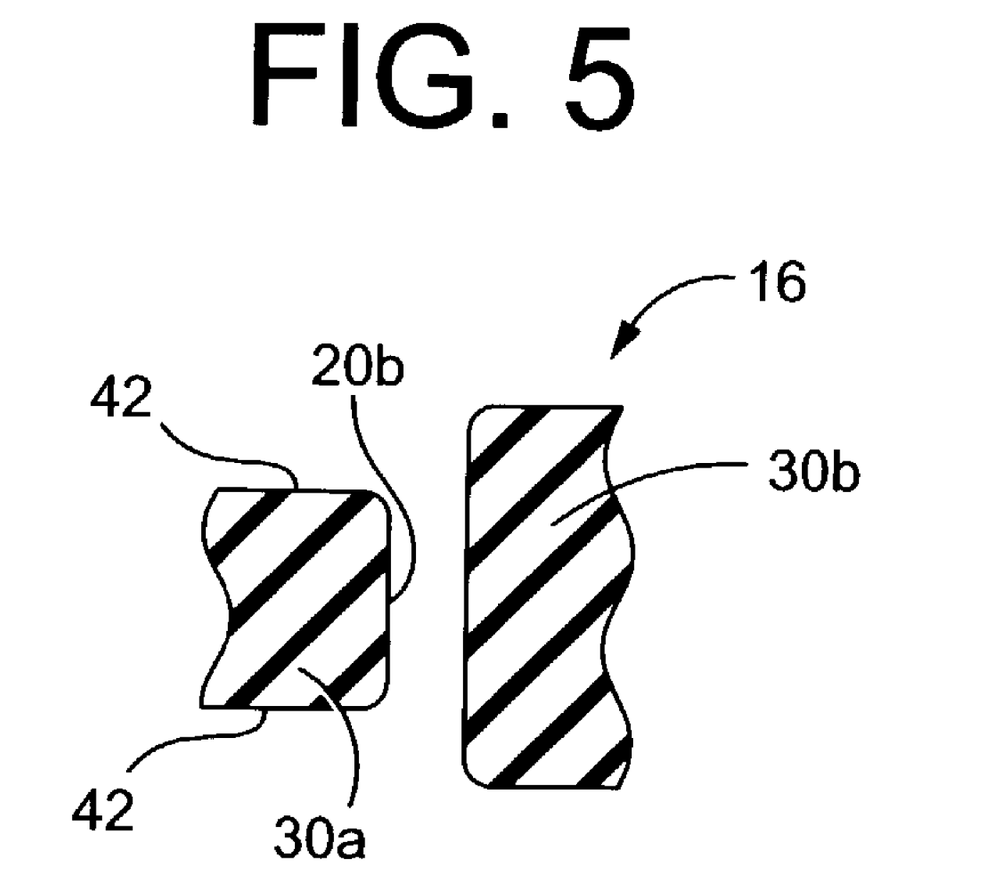
FIG. 5 is a cross sectional view taken along line 5-5 of FIG. 3.

Another arrangement to meet this end is explanatory shown in FIG. 5. Namely, the first segments 30a, 30c with the relatively small circumferential width dimension has an axial length that is made smaller than that of the second segments 30b, 30d with the relatively large circumferential width dimension, such that the axial opposite end faces 42, 42 of the first segments 30a, 30c are retracted axially inwardly from the corresponding axial opposite end faces of the second segments 30b, 30d.

In the suspension bushing 40 constructed according to this embodiment, the first segments 30a, 30c, which are opposed to each other in the traveling direction of the vehicle are diminished in their pressure receiving volumes both in the axial and circumferential directions thereof. Accordingly, a ratio of the pressure receiving volumes of the first segments 30a, 30c to the pressure receiving volumes of the second segments 30b, 30d is made considerably smaller than that in the suspension bushing 10 of the first embodiment, resulting in a sufficiently large ratio of spring constants of the elastic body 16 in the mutually orthogonal diametric directions.

A specimen of the suspension bushing 10 constructed according to the first embodiment was prepared in which the angle α of the intersections defined by the two diametric lines 22, 24 measured 75 degrees (α=75 degrees), and each axial bore 20 measured 15 degrees in circumferential length about the center axis 18. The prepared specimen of the suspension bushing 10 was actually measured in terms of dynamic spring constant in two mutually orthogonal diametric directions, i.e., the vertical and horizontal directions as seen in FIG. 1. The obtained ratio of the dynamic spring constants of the elastic body 16 in the vertical and horizontal directions was about 1 to 1.3. A specimen of the suspension bushing 40 constructed according to the second embodiment was also prepared in which the angle α of the intersections defined by the two diametric lines 22, 24 measured 60 degrees (α=60 degrees), and each axial bore 20 measured 15 degrees in circumferential length about the center axis 18, and the axial length of the second segments 30b, 30d was made about 2.5 times that of the first segments 30a, 30c. The prepared specimen of the suspension bushing 40 was actually measured in terms of dynamic spring constant in the vertical and horizontal directions as seen in FIG. 3, likewise, and the obtained ratio of the dynamic spring constants of the elastic body 16 in the vertical and horizontal directions was about 1 to 1.9.

Figure 6:
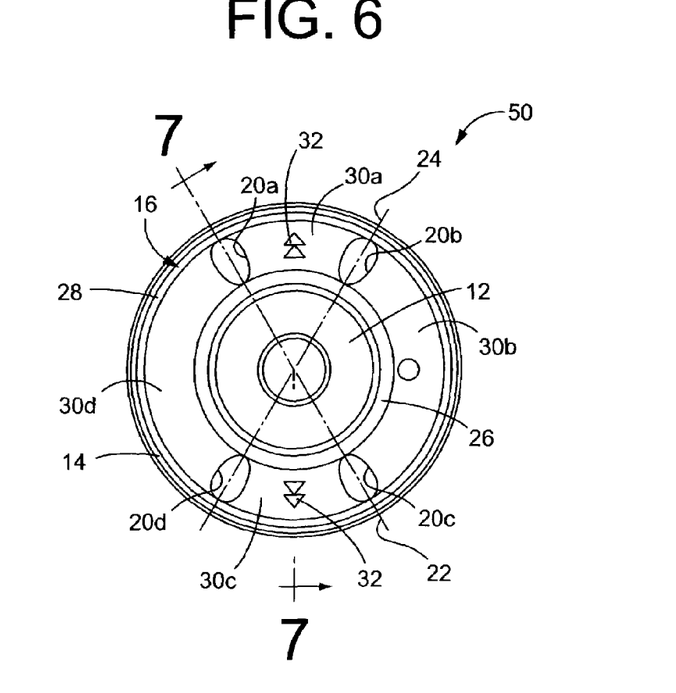
FIG. 6 is an elevational view in one of opposite axial ends of a vibration isolating bushing in the form of a suspension bushing for use in the automotive vehicle, which is constructed according to a third embodiment of the invention.
Figure 7:
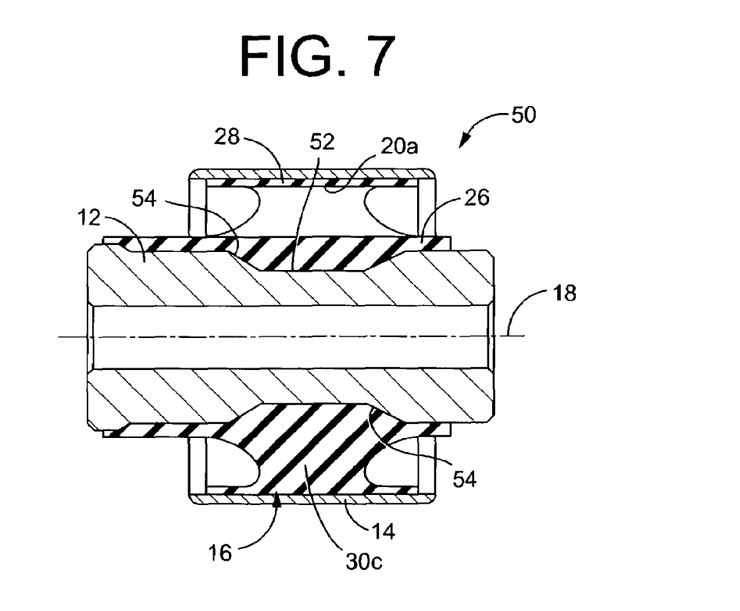
FIG. 7 is a cross sectional view taken along line 7-7 of FIG. 6.

Referring next to FIGS. 6-7, a suspension bushing 50 for use in automotive vehicles is depicted as a third embodiment of a vibration isolating bushing of the present invention. In the following description, the same reference numerals as used in the first embodiment will be used for identifying structurally corresponding elements and portions, of which no detailed description will be provided.

The suspension bushing 50 of the present embodiment has been developed in order to provide a sufficiently large ratio of spring constants of the elastic body 16 in the axial direction and radial directions perpendicular to the axial direction. To this end, the suspension bushing 50 of the present embodiment employs the inner sleeve 12 whose configuration is different from that in the suspension bushing 10 of the first embodiment.

Described more specifically, the inner sleeve 12 in the suspension bushing 50 is basically identical with the inner sleeve 12 in the suspension bushing 10 in its entire shape of thick-walled straight cylinder, but different in that a circumferential groove 52 is formed at its axially central portion so as to be open in its outer circumferential surface and to extend over its circumference with a generally constant depth and axial width dimensions and cross sectional shape. In the circumferential groove 52, axially opposite sidewalls gradually extends axially outwardly as their radial dimensions increase, thereby providing tapered surfaces 54, 54. A bottom surface of the circumferential groove 52 has an axial length that is generally equal to a minimum axial length of the elastic body 16, and is located at an axial position that is generally equal to a portion of the elastic body 16 where its axial length is minimized (i.e., the outer circumferential portion of the elastic body 16). On the other hand, the opening of the circumferential groove 52 are made generally equal in its axial length and position to those of the inner circumferential portion of the elastic body 16 where the axial length of the elastic body 16 is maximized.

In the suspension bushing 50 constructed according to the present embodiment, the provision of the circumferential groove 52 permits the first and second segments 30a, 30b, 30c, 30d to increase their radial dimensions by an amount corresponding to the radial width of the circumferential grooves 52, without needing an increase of the outer diameters of the elastic body 16 and the outer sleeve 14, thus effectively providing a free length of the elastic body 16 in diametric or radial directions. Therefore, the suspension bushing 50 can exhibit soft spring characteristics with respect to input radial vibrational loads. With respect to input axial vibrational loads, on the other hand, the suspension bushing 50 can exhibit the generally same spring characteristics as in the suspension bushing 10 of the first embodiment, since a part of the elastic body 16 filling the circumferential groove 52 is isolated from the axial loads with the help of the circumferential groove 52 and become malfunction so as not to give a substantial effect on the spring characteristics of the suspension bushing 50 in the axial direction.

Therefore, the suspension bushing 50 constructed according to the present embodiment is capable of exhibiting a relatively small dynamic spring constant in a variety of radial directions, while effectively maintaining its axial spring constant, in comparison with the suspension bushing 10 of the first embodiment, thereby increasing a degree of freedom in tuning the spring characteristics of the suspension bushing 50.

A specimen of the suspension bushing 50 constructed according to the third embodiment was prepared in which the angle α of the intersections defined by the two diametric lines 22, 24 measured 75 degrees (α=75 degrees), and each axial bore 20 measured 15 degrees in circumferential length about the center axis 18, while the circumferential groove 52 was formed on the inner sleeve 12 with a depth dimension equal to about one-fourth (¼) of the radial dimension of the elastic body 16. Measurements performed on the prepared specimen of the suspension bushing 50 have revealed that the suspension bushing 50 of the present invention can minimize its radial dynamic spring constants to about 80% of that of the suspension bushing 10 of the first embodiment, while maintaining its axial dynamic spring constant equal to that of the suspension bushing 10.

Figure 8:
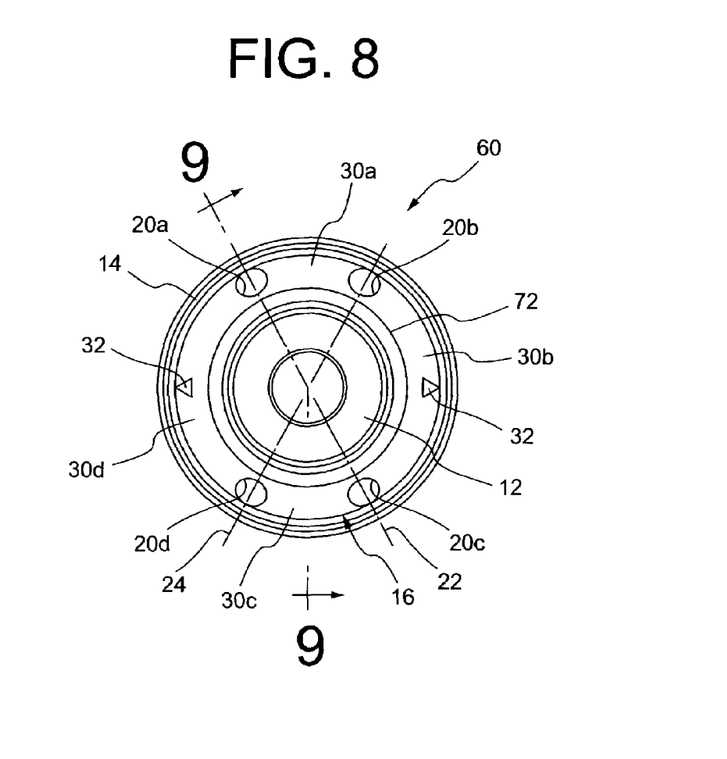
FIG. 8 is an elevational view in one of opposite axial ends of a vibration isolating bushing in the form of a suspension bushing for use in the automotive vehicle, which is constructed according to a fourth embodiment of the invention.
Figure 9:
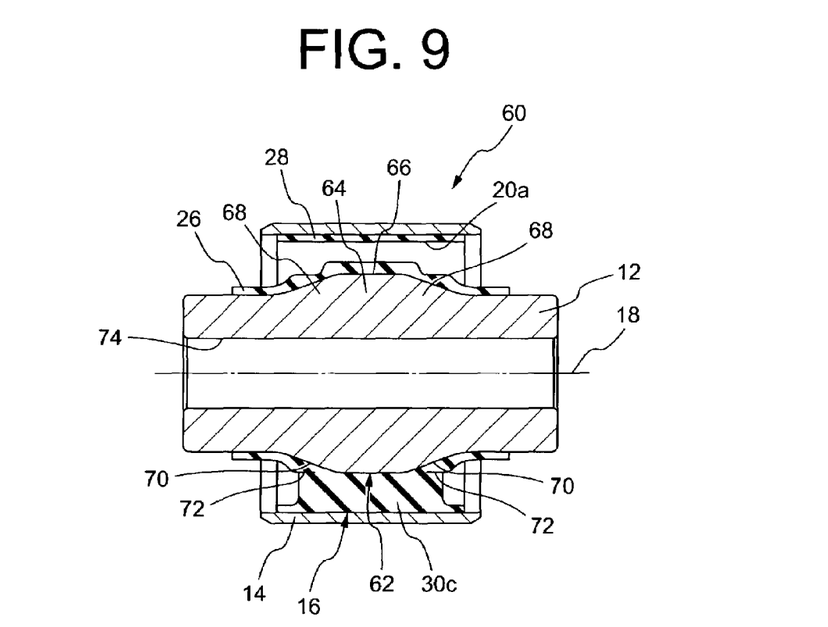
FIG. 9 is a cross sectional view taken along line 9-9 of FIG. 8.

Referring next to FIGS. 8-9, a suspension bushing 60 for use in automotive vehicles is depicted as a fourth embodiment of a vibration isolating bushing of the present invention. In the following description, the same reference numerals as used in the first embodiment will be used for identifying structurally corresponding elements and portions, of which no detailed description will be provided.

The suspension bushing 60 of the present embodiment has been developed in order to decrease a dynamic spring constant or spring stiffness of the elastic body 16 in a twisting direction in which center axes of the inner and outer sleeves 12, 14 are inclined relative to each other, while effectively maintaining dynamic spring constant or spring stiffness of the elastic body 16 in diametric or radial directions perpendicular to the center axis 18 of the suspension bushing 60. To this end, the suspension bushing 60 of the present embodiment employs the inner sleeve 12 whose configuration is different from that in the suspension bushing 10 of the first embodiment.

Described more specifically, the inner sleeve 12 in the suspension bushing 60 is basically identical with the inner sleeve 12 in the suspension bushing 10 in its entire shape of thick-walled straight cylinder, but different in that a large-diameter portion 62 is integrally formed at its axially central portion so as to protrude radially outwardly. The diameter of the large-diameter portion 62 is maximized in its axially central portion to thereby provide a largest diameter portion 64 whose outer circumferential surface has a generally cylindrical shape with a given axial length so as to provide a large-diameter outer circumferential surface 66. The large-diameter portion 62 further includes a pair of varying diameter portions 68, 68 formed at axially opposite sides of the large-diameter outer circumferential surface 66, each decreasing gradually its outer diameter as its axial position moves axially outwardly. Thus, the pair of varying diameter portions 68, 68 provide tapered outer circumferential surfaces 70, 70 of tapered cylindrical shape. An overall outer circumferential surface of the large-diameter portion 62 is therefore provided by smoothly connecting the large-diameter outer circumferential surface 66 to the straight outer circumferential surface of the inner sleeve 12 by the presence of the tapered outer circumferential surfaces 70, 70, with no step formed thereon. Preferably, the overall outer circumferential surface of the large-diameter portion 62 including junctions of the tapered outer circumferential surfaces 70, 70 with the adjacent parts of the straight outer circumferential surface of the inner sleeve 12, is formed smoothly with no edges by a cooperation of the large-diameter outer circumferential surface 66 with the tapered outer circumferential surfaces 70, 70. The inner sleeve 12 of the present embodiment may be formed by forging, cutting, bulging, or other possible measures. In this respect, a bore 74 of the inner sleeve 12 are not necessarily made constant over its axial entire length.

In the present embodiment, the large diameter portion 62 of the inner sleeve 12 is arranged to have its entire axial length which is made generally equal to or slightly smaller than the axial length of the outer sleeve 14. The entire axial length of the inner sleeve 12 includes the axial lengths of the largest diameter portion 64 and the pair of varying diameter portions 68, 68. The elastic body 16 elastically connecting the opposite surfaces of the inner and outer sleeves 12, 14 are directly bonded to the large-diameter outer circumferential surface 64 and the tapered outer circumferential surfaces 70, 70 of the large-diameter portion 62, during the above-described vulcanization process. That is, a part of the elastic body 16 functioning for substantially connecting the inner and outer sleeves 12, 14 has an axial length that is made sufficiently larger than that of the largest-diameter portion 64 of the inner sleeve 12, spacings between the tapered outer circumferential surfaces 70, 70 and the outer sleeve 14 are directly filled with the elastic body 16.

Figure 10:
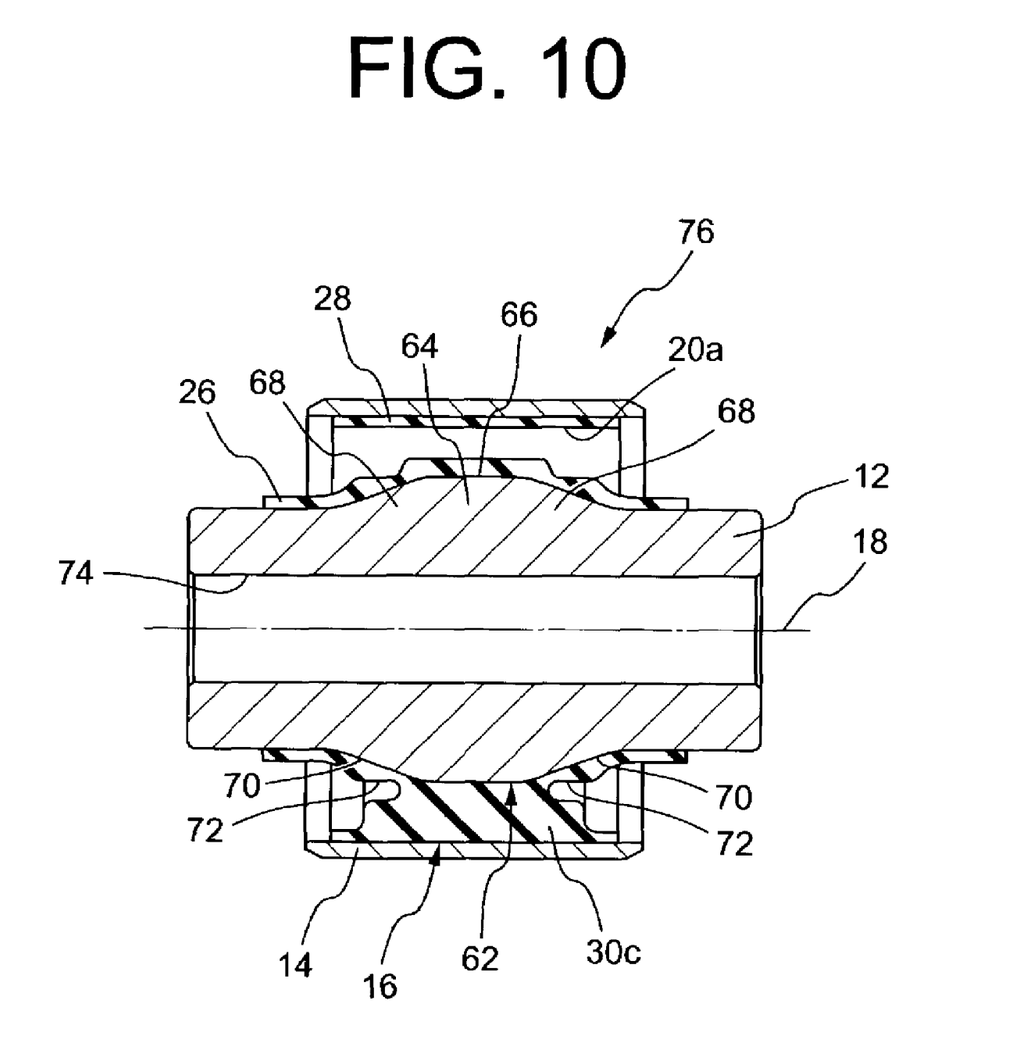
FIG. 10 is a cross sectional view corresponding to FIG. 9 wherein an integral vulcanized product of the suspension bushing of FIG. 8.

Also, the elastic body 16 is provided with a pair of annular slit-like grooves 72, 72 extending circumferentially between the inner and outer sleeves 12, 14, as depicted in an integrally vulcanized assembly 76 shown in FIG. 10. These slit-like grooves 72, 72 are open in the opposite axial end faces of the elastic body 16 and located radially outward of the tapered surfaces 70, 70 of the inner sleeve 12, respectively. Also, these slit-like grooves 72, 72 extend axially inwardly from the opposite axial end faces of the elastic body 16 with a given axial length not to allow their bottom portions to reach the large-diameter outer circumferential surface 66. The width dimension of each slit-like groove 72, as measured in the axial direction of the inner and outer sleeves 12, 14, is suitably determined, but not particularly limited, with required spring characteristics in a twisting direction of the elastic body 16 taken into consideration, so as to permit the elastic body 16 to exhibit sufficient durability and strength with respect to axial or twisting loads applied between the inner and outer sleeves 12, 14. In order to effectively reduce a spring constant in the twisting direction of the elastic body 16, the width dimension of each slit-like groove 72 is generally determined while taking into account a dimension of about one-sixth (⅙) of the substantial axial length of the elastic body 16 (i.e., an axial length of a minimum portion of the part of the elastic body 16 adapted to substantially connect the inner and outer sleeves 12, 14 in the radial direction), as a guideline.

Each slit-like groove 72 has a generally constant radial or width dimension in its circumferential direction and its axial or depth direction, and is formed to be located radially outward of the inner sleeve 12 with a slight radial spacing therebetween, and to extend circumferentially about a center axis of the inner sleeve 12 to provide an annular configuration. In particular, the slit-like grooves 72, 72 are located to be close to the inner sleeve 12 rather than the outer sleeve 14 so that inner circumferential wall surfaces of the slit-like grooves 72, 72 have a diameter generally equal to that of the largest-diameter outer circumferential surface 66 of the inner sleeve 12.

An integrally vulcanized assembly 76 shown in FIG. 10, which consists of the inner and outer sleeves 12, 14 and the elastic body 16, may be formed by setting the inner and outer sleeves 12, 14 subjected to an adhesive treatment in advance, in a mold cavity having a profile corresponding to a desired form of the elastic body 16, and by injecting and vulcanizing a given amount of suitable rubber material therein. The thus formed integrally vulcanized assembly 76 may be subjected to a suitable drawing operation, e.g., all directional drawing, so that a given amount of pre-load is applied to the elastic body 16. Namely, the pair of slit-like grooves 72, 72 are open in the respective opposite axial end faces of the elastic body 16 with the given radial width in the integrally vulcanized assembly 76 as shown in FIG. 10, before the drawing operation. As a result of the drawing operation performed on the integrally vulcanized assembly 76, the pair of slit-like grooves 72, 72 are both compressed in the radial direction such that their inner and outer circumferential wall surfaces are laminated on and held in contact with each other, thereby substantially eliminating spacing formed by the slit-like grooves 72, 72.

In the suspension bushing 60 constructed according to the present embodiment, the spacing formed by the slit-like grooves 72 are substantially eliminated in the radial direction, so that input radial loads can be transmitted to the elastic body 16 with few influence due to the presence of the pair of slit-like grooves 72, permitting the suspension bushing 60 to exhibit a desired spring stiffness with respect to input radial loads. With respect to input twisting loads, on the other hand, the suspension bushing 60 can exhibit satisfactory soft dynamic spring characteristics or spring stiffness with the help of the above-described arrangements. Namely, the radial spacing between the inner and outer sleeves 12, 14 and the radial thickness of the elastic body 16 is made larger at the axially opposite end portions than the axially central portion, since an amount of displacement between the inner and outer sleeves 12, 14 relative to each other caused by the input twisting loads is made larger at the axially opposite end portions rather than the axially central portion in which a center of twist is located. In addition, the pair of slit-like grooves 72, 72 are formed at axially opposite end portions of the elastic body 16 where an amount of elastic deformation (deformation or stress) of the elastic body 16 due to the input twisting loads is maximized for dividing and reducing tensile stress applied to the axially opposite end portions of the elastic body 16.

As is understood from the aforesaid description, the suspension bushing 60 of the present embodiment is capable of effectively tuning the ratio of the spring constants in the two mutually orthogonal diametric directions with the help of the presence of the two pairs of the axial bores 20a, 20b, 20c, 20d, like the suspension bushing 10 of the first embodiment. In addition, the suspension bushing 60 is able to tune its spring characteristics in the twisting direction independently or with a ratio of the spring constants in the axial direction and radial directions taken into consideration, by suitably changing the shape or size of the large diameter portion 62 of the inner sleeve 12.

While the presently preferred embodiments of this invention have been described above in detail for the illustrative purpose only, it is to be understood that the present invention is not limited to the details of the illustrated embodiments, but may be otherwise embodied.

For instance, the circumferential groove 52 formed in the inner sleeve 12 of the suspension bushing 50 of the third embodiment may be arranged to be discontinuous in the circumferential direction such that the circumferential grooves 52 are provided only at circumferential portions where the first segments 30a, 30c are formed. This arrangement makes it possible to further soften the spring characteristics in the radial direction of the segments 30a, 30c in comparison with the spring characteristics in the radial direction of the second segments 30b, 30d. In the case where the circumferential groove 52 is continuously formed over the entire circumference of the inner sleeve 12, it may also be possible to tune the spring characteristics in the radial direction of the first segments 30a, 30c and the second segments 30b, 30d relative to each other, by suitably varying depth and/or axial width dimensions of the circumferential groove 52 in the circumferential direction of the inner sleeve 12.

In the suspension bushing 60 according to the fourth embodiment, the configuration and size of the large-diameter portion 62 of the inner sleeve 12 may be suitably changed in the circumferential direction for adjusting spring characteristics of the suspension bushing 60 in the twisting direction. The specific configuration of the large diameter portion 62 is suitably determined with required vibration isolating characteristics or the like taken into consideration. The spring characteristics of the suspension bushing 60 in the twisting direction may be changed by suitably changing the axial length of the large-diameter outer circumferential surface 66 and tapered angles of the tapered outer circumferential surfaces 70, 70 and/or by changing the profile of the large diameter portion 62 into a spherical shape. Also, the axially opposite end portions of the outer sleeve 14 are drawn radially inwardly by a relatively large amount in comparison with that in the axially central portion of the outer sleeve 14 so that inner circumferential surfaces of axially opposite end portions of the outer sleeve 14 are tapered to correspond to the varying diameter portion 68 of the inner sleeve 12. This arrangement makes it possible to increase a degree of freedom in tuning the spring characteristics of the suspension bushing 60 in the twisting direction, or a ratio of the spring constants in the radial and twisting directions or in the axial and twisting directions of the suspension bushing 60.

While the illustrated embodiments described above relate to the suspension bushings for use in automotive vehicles, the principle of the present invention is equally applicable to other types of vibration isolating devices or bushings for use in automotive vehicles or for use in various devices other than the vehicles, e.g., a vibration isolating support system for a power device, like motors.

It is also to be understood that the present invention may be embodied with various other changes, modifications and improvements, which may occur to those skilled in the art, without departing from the spirit and scope of the invention defined in the following claims.

What is claimed is:

1. A cylindrical suspension bushing for an automotive vehicle, comprising:

a cylindrical inner shaft member;

a cylindrical outer sleeve member disposed radially outward of said inner shaft member; and an elastic body disposed in between and elastically connecting said inner shaft member and said outer sleeve member, wherein said elastic body is provided with two pairs of axial bores diametrically opposed to each other with said inner shaft member interposed therebetween, said axial bores axially extending through said elastic body between said inner shaft member and said outer sleeve member and being independent of each other, wherein said elastic body is circumferentially divided in terms of stress transmission by said two pairs of axial bores into two pairs of segments diametrically opposed to each other with said inner shaft member interposed therebetween, wherein two diametric lines, which extends in directions in which said two pairs of axial bores are respectively opposed to each other, intersect obliquely so that said two pairs of segments are made different from each other in their circumferential length for differentiating spring characteristics of said bushing in two diametric directions in which said two pairs of segments are opposed to each other, respectively, wherein said two pairs of axial bores are provided in said elastic body for adjusting sizes of pressure-receiving regions of said elastic body in mutually orthogonal diametric load input directions, wherein each of said axial bores has a biased ellipsoidal shape in transverse cross section, whose circumferential width dimension is made larger on a side of said outer sleeve member rather than on a side of said inner shaft member, and wherein each of said axial bores is formed such that a radially inner small-diameter arc portion and a radially outer large-diameter arc portion are connected with each other at their opposite circumferential ends via curved lines.

2. A cylindrical suspension bushing according to claim 1, wherein each of said axial bores has a circumferential length smaller than circumferential lengths of any one of said two pairs of segments.

3. A cylindrical suspension bushing according to claim 1, wherein a ratio of dynamic spring constants in said two diametric directions in which said two pairs of segments are opposed to each other is smaller than one to two.

4. A cylindrical suspension bushing according to claim 1, wherein one of said two pairs of segments has a circumferential length smaller than a circumferential length of an other one of said two pairs of segments, and is arranged to have an axial length smaller than an axial length of said other one of said two pairs of segments.

5. A cylindrical suspension bushing according to claim 1, wherein points of intersections between circumferential center lines of said axial bores and an inner circumference of said outer sleeve member are all located outward of said inner shaft member as seen in projections in said two diametric directions in which said two pairs of segments are opposed to each other, respectively.

6. A cylindrical suspension bushing according to claim 1, wherein said two diametric directions in which said two pairs of segments are respectively opposed to each other are aligned to vibration input directions, respectively.

7. A cylindrical suspension bushing according to claim 1, wherein said elastic body is directly bonded to an outer circumferential surface of said inner shaft member, and said inner shaft member is formed with a circumferential groove extending circumferentially and open in a portion of said outer circumferential surface to which said elastic body is bonded.

8. A cylindrical suspension bushing according to claim 1, wherein in one of mutually orthogonal diametric load input directions, a distance B1 between points of intersections between an inner circumferential surface of the outer sleeve member and the two diametric lines is larger than an outer diameter D of the inner shaft member, while in an other one of mutually orthogonal diametric load input directions, a distance B2 between points of intersections between the inner circumferential surface of the outer sleeve member and the two diametric lines is larger than the outer diameter D of the inner shaft member.

9. A cylindrical suspension bushing according to claim 1, wherein in one of mutually orthogonal diametric load input directions, a distance b1 between points of intersections between an outer circumferential surface of the inner shaft member and the two diametric lines is smaller than the outer diameter D of the inner shaft member, while in an other one of mutually orthogonal diametric load input directions, a distance b2 between points of intersections between the outer circumferential surface of the inner shaft member and the two diametric lines is smaller than the outer diameter D of the inner shaft member.

10. A cylindrical suspension bushing according to claim 1, wherein an angle $\alpha$ of a pair of intersections defined by the two diametric lines and opposite with each other in a first diametric direction is held in a range of about 60°-75°.

11. A cylindrical suspension bushing according to claim 1, wherein one of said two pairs of segments has a circumferential length smaller than that in an other one of said two pairs of segments, and are opposed to each other in a vehicle traveling direction, and the other one of said two pairs of segments are opposed to each other in a vehicle lateral direction.

* * * * *